United States Patent Office 3,445,696
Patented May 20, 1969

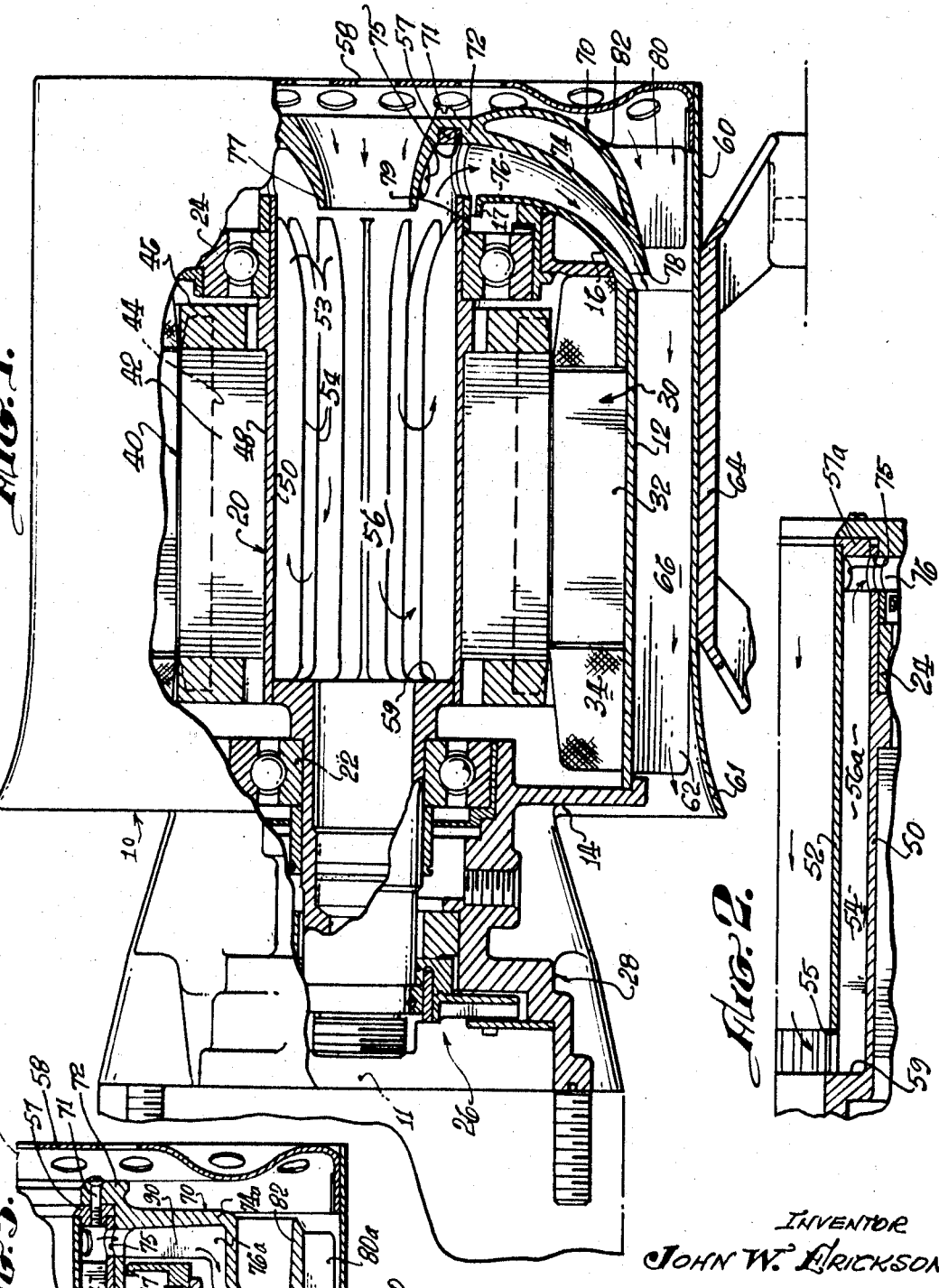

3,445,696
AIR-COOLED DYNAMOELECTRIC MACHINE
John W. Erickson, Huntington Beach., Calif., assignor to Preco, Inc., Los Angeles, Calif., a corporation of California
Filed Nov. 13, 1967, Ser. No. 682,060
Int. Cl. H02k 1/20, 9/06, 9/00
U.S. Cl. 310—59                                    8 Claims

ABSTRACT OF THE DISCLOSURE

A dynamoelectric machine having a hollow shaft with a plurality of radial blades positioned therein for cooling the rotor portion of the machine. A plurality of blades are mounted on a venturi arrangement which, in turn, is secured within one end portion of said machine for aiding and guiding the flow of the air streams into the stator portion of said machine. Said stator portion is provided with an annular space which includes a plurality of elongated fins for conducting the air streams therethrough. Said one end of the machine is provided with a protective screen for regulating the air inflow into the machine.

---

This invention relates to dynamoelectric machines, such as motors and generators, in which the windings are enclosed by a housing structure. That structure may be capable of resisting internal explosion, preventing propagation of flame outside the housing and excluding foreign substances, such as salt spray.

A particular object of the present invention is to provide economical and reliable means for cooling such machines, using air as the cooling medium. Heat developed in the stator winding of such a machine can be conducted with good efficiency to the housing wall and removed therefrom by external air circulation. However, the prior art has not successfully solved the problem of utilizing air circulation for removal of heat generated in the rotor. Numerous proposals have been made for circulating air directly over the rotor, but such structures are not compatible with full enclosure of the motor, nor with explosion proof sealing of such enclosures.

The present invention utilizes a hollow shaft upon which the rotor is mounted in good heat conductive relationship, and provides effective air circulation within the rotating shaft for removal of the transmitted heat.

The invention further provides particularly effective and economical fan mechanism for inducing such air circulation. In preferred form of the invention the fan draws air through the hollow shaft and delivers it as an axially flowing stream over the external surface of the housing, thus providing both internal and external cooling of the machine by means of a unitary fan structure. The described air flow is preferably induced primarily by suction produced by venturi action of a relatively large axial air stream that is driven by fan blades of axial type mounted on the outer periphery of the fan structure. The venturi suction may be aided by viscous drag on the surface of a rotating disc which acts as a radial fan but consumes very little power. As an alternative, radial fan blades of generally conventional type may be added.

A full understanding of the invention and of its further objects and advantages will be had from the following description of certain illustrative manners in which it may be carried out. The particulars of that description, and of the accompanying drawings which form a part of it, are intended only as illustration and not as a limitation upon the scope of the invention, which is defined in the appended claims.

In the figures:
FIG. 1 is an axial section representing an illustrative embodiment of the invention in a motor for driving a fluid pump;
FIG. 2 is a fragmentary axial section representing a modification; and
FIG. 3 is a fragmentary axial section representing a further modification.

In the illustrative structure shown in the drawings the motor housing is indicated generally by the numeral 10 and comprises the generally cylindrical housing portion 12, the inner end wall 14 and the outer end wall 16. The rotor shaft 20 is journaled on the axis 11 on the bearings 22 and 24 which are carried by the inner and outer housing end walls 14 and 16, respectively. Shaft 20 extends axially beyond inner bearing 22 and carries the fluid pump structure indicated schematically at 26. That pump is enclosed within the pump housing 28, which is typically formed integrally with inner housing wall 14. That wall and the pump structure form together a flame-proof barrier at the inner end of shaft 20. A corresponding barrier at the outer end of the shaft is provided by the flange structure 17, which forms a part of outer end wall 16.

The motor stator assembly 30, comprising the stator laminations 32 and stator winding 34, is mounted coaxially of shaft 20 within cylindrical portion 12 of the housing and in good heat conductive relation with that housing portion. The rotor assembly 40 comprises the rotor laminations 42 and the electrically conductive bars 44, which are mechanically and electrically interconnected by the rotor end rings 46. Rotor laminations 42 are mounted in good heat conductive relation on the cylindrical surface 48 of shaft 20.

In accordance with an illustrative form of the present invention, shaft 20 comprises a main tubular member 50, which extends the full axial length of rotor laminations 42 and continues essentially to the axially outer end of the shaft. Tubular shaft 50 carries on its inner surface radially extending fins 54, which are preferably formed integrally, as by extrusion. The chamber 56 within the shaft opens axially outwardly to the atmosphere through the protective screen 58. The outer housing sleeve 60 is spaced outwardly from housing portion 12 and is rigidly connected to that portion by the radially extending fins 62. The support bracket 64 for the motor and pump is typically mounted on sleeve 60, as is screen 58.

Air circulation for cooling the described structure is produced entirely by the fan assembly 70. That fan assembly comprises the hub structure 72, which is rigidly mounted by the screws 71 on the outer end of shaft 20 by means of the inner flange 57. The fan web 74 extends from hub structure 72 radially outwardly in axially spaced relation to housing end wall 16. Web 74 preferably follows in a general way any irregularities in that housing wall, so that the chamber 76 formed between them has an axial dimension that varies substantially uniformly, typically becoming smaller as the radius increases. Substantially free air flow is provided into the radially inner periphery of that chamber by a series of angularly spaced openings 75 formed in outer shaft sleeve 50 and in the spacing sleeve 79. Shaft fins 54 are preferably cut away at their axially outer ends, as indicated at 53, thus permitting circumferential air circulation adjacent openings 75.

Fan web 74 carries at its periphery the radially extending fan blades 80 which may be mounted on the fairing 82. Those blades are designed to produce axial air flow through the annular space defined by fairing 82 and outer housing sleeve 60, that flow being directed toward annular space 66. The axially inner end of sleeve 60 is preferably flared, as indicated at 61, forming a diffuser for returning the cooling airstream to the atmosphere. The junction between radial passage 76 and annular space 66 is formed, as indicated at 78, to produce venturi action for drawing air strongly from passage 76 into the main airstream in annular space 66. That suction is aided by the velocity increase produced in the neighborhood of fan blades 80 by the form of fairing 82, and by action of diffuser 61. The outward flow of air in passage 76 is also aided by the viscous drag at the surface of fan web 74, which acts as a radial fan but with relatively little power consumption. The air thus drawn through passage 76 is taken from chamber 56 within the shaft. Airflow is thereby induced from the atmosphere axially inward into chamber 56. That flow tends to produce active circulation throughout chamber 56, providing effective thermal contact with fins 54 to remove heat from the rotor. Such general circulation in chamber 56 is aided by the fairing indicated at 77, which may form a part of the fan structure.

In operation of the described cooling mechanism, fan blades 80 produce a primary airstream axially inward through the annular space 66, cooling the stator assembly by conduction through housing wall 12 to fins 62 and that airstream; and produce, largely by venturi action, a secondary airstream from the atmosphere axially into the interior of shaft tube 50, cooling the rotor assembly by conduction through fins 54 to that secondary airstream. Since the return airstream emerges at the opposite end of the motor from the air intake through screen 58, there is minimum feedback of heated air to the inlet.

FIG. 2 represents a modified form of the invention, in which fairing 77 of FIG. 1 may be considered to be extended axially inward for substantially the entire length of shaft chamber 56. As shown in FIG. 2, an inner sleeve 52 is rigidly mounted at its outer end on shaft flange 57a, as by welding, and its inner end is supported by the fins 54. Those fins, in the present embodiment, may be formed integrally with inner sleeve 52, and be dimensioned to contact firmly the main shaft tube 50. The inner end 55 of sleeve 52 stops short of shaft shoulder 59, leaving an ample radial passage for airflow from the interior of the inner sleeve to the annular chamber 56a between that sleeve and the main shaft tube 50. Air is thereby directed more positively over fins 54 to the openings 75 and radial passage 76, already described.

FIG. 3 represents a further modification, in which the housing end wall 16 is more angular in form than in FIG. 1, and fan web 74a conforms generally to that end wall form to maintain essential uniformity of cross section of radial passage 76a. Also, airflow through that passage is directly driven by the fan blades 90, which are mounted on web 74a and act as a radial fan. That action may supplement the venturi suction previously described. Alternatively fan blades 90 may produce so strong an outlet stream at the orifice 92 as to actively induce flow through annular passage 66. When that is the case, axial fan blades 80a may be designed to consume less power than in the first described embodiment, or even may be omitted entirely. In either case, however, enough atmospheric air is drawn through screen 58 directly into annular passage 66 to add an appreciable mass of relatively cool air to the already heated air from the shaft interior.

Although the present embodiment of the invention are designed for alternating current operation, and do not require a commutator, it will be understood that the described systems for removing heat from the rotor are well adapted for removing heat generated in, or at the surface of, a commutator, which may be mounted on the outer surface of shaft sleeve 50 between rotor assembly 40 and outer bearing 24, for example. Heat conduction from a commutator to sleeve 50 and hence to the airstream in chamber 56 can be greatly facilitated by constructing and mounting the commutator in the manner described in my copending patent application Ser. No. 658,841, filed Aug. 7, 1967, under the title, Cooling of Dynamoelectric Machines.

I claim:
1. A dynamoelectric machine comprising a housing including a generally cylindrical portion, a stator assembly including a stator winding and mounted within the cylindrical portion of the housing, bearing means supported on the housing coaxially of the stator assembly, a shaft journaled in the bearings and carrying a rotor for cooperating electrodynamically with the stator assembly, said housing including structure at the inner end of the housing adapted to support a rotary device for operative connection to the shaft and structure at the outer end of the shaft forming a housing end wall that extends generally radially between the shaft and said cylindrical portion of the housing with an aperture through which the shaft projects, said machine being characterized by:
   the portion of the shaft within the rotor comprising a hollow shaft tube in heat conductive relation to the rotor and open at its outer end to receive cooling air from outside the housing,
   an outer sleeve rigidly mounted on the housing and forming with said cylindrical housing portion an annular passage,
   fan blades mounted on the shaft for driving air axially through said annular passage to cool the cylindrical housing portion and the stator assembly,
   and structure forming a generally radial passage for air flow from the interior of said shaft tube into said annular passage,
   the annular passage being formed to produce a venturi formation for drawing air into the annular passage from said radial passage and the interior of the shaft tube to cool the shaft tube and the rotor.

2. A dynamoelectric machine as defined in claim 1, and including also:
   structure mounted on the shaft axially outward of the housing end wall and forming a web that extends radially outward from the shaft in axially spaced relation to the end wall and forming therewith at least a portion of said radial passage,
   the fan blades being mounted on the periphery of said web.

3. A dynamoelectric machine as defined in claim 2, and including also:
   axially extending fan blades mounted on said web for increasing the air flow through said radial passage.

4. A dynamoelectric machine as defined in claim 1, and including also:
   an inner sleeve coaxially mounted within said shaft tube and forming therewith an annular chamber,
   said annular chamber communicating adjacent its axially outer end with said radial passage and adjacent its axially inner end with the interior of the inner sleeve.

5. A dynamoelectric machine comprising a housing including a generally cylindrical portion, a stator assembly including a stator winding and mounted within the cylindrical portion of the housing, bearing means supported on the housing coaxially of the stator assembly, a shaft journaled in the bearings and carrying a rotor for cooperating electrodynamically with the stator assembly, structure at the inner end of the housing adapted to support a rotary device for operative connection to the shaft, and structure at the outer end of the shaft forming a housing end wall that extends generally radially between the shaft and said cylindrical portion of the housing with an aperture through which the shaft projects, said machine being characterized by:
   the portion of the shaft within the rotor comprising two coaxial sleeves having an annular space between them, the inner sleeve being open at its outer end to receive cooling air from outside the housing, and the outer sleeve being in heat conductive relation to the rotor,
   passage means between the interior of the inner sleeve and said annular space adjacent the inner end of the rotor, radial fan means mounted on the shaft outwardly of said housing end wall and having a fan inlet communicating with said annular space and a fan outlet directed generally axially inwardly along the exterior of said cylindrical portion of the housing.

6. A dynamoelectric machine as defined in claim 5, and including also a plurality of heat conductive angularly spaced fins extending between the inner and outer shaft sleeves and dividing said annular space into a plurality of passages that extend generally axially between said passage means and said fan inlet.

7. A dynamoelectric machine as defined in claim 5, and in which said radial fan means comprise:
structure forming a web that extends radially outward from the shaft in axially spaced relation outward of housing end wall,
and radial fan blades mounted on the web and extending generally axially therefrom with blade edges closely adjacent the housing end wall.

8. A dynamoelectric machine as defined in claim 7, and including also:
a cylindrical sleeve mounted coaxially on said housing and spacedly enclosing at least a portion of said cylindrical portion of the housing and extending axially outwardly thereof beyond said fan web,
said fan outlet being directed axially inwardly into the space between that sleeve and the cylindrical portion of the housing,
and axial fan blades mounted on said fan web for directing additional air axially inwardly into the last said space.

References Cited
UNITED STATES PATENTS

| | | | |
|---|---|---|---|
| 2,610,992 | 9/1952 | Johns | 310—59 |
| 2,785,325 | 3/1957 | Keyner | 310—59 |
| 2,974,240 | 3/1961 | Arutunoff | 310—54 |
| 3,214,614 | 10/1965 | Maeder | 310—54 |

WARREN E. RAY, *Primary Examiner.*

R. SKUDY, *Assistant Examiner.*

U.S. Cl. X.R.

310—61, 62